H. F. SCHMIDT.
TRACTOR.
APPLICATION FILED FEB. 9, 1918.
1,356,744.
Patented Oct. 26, 1920.
5 SHEETS—SHEET 1.
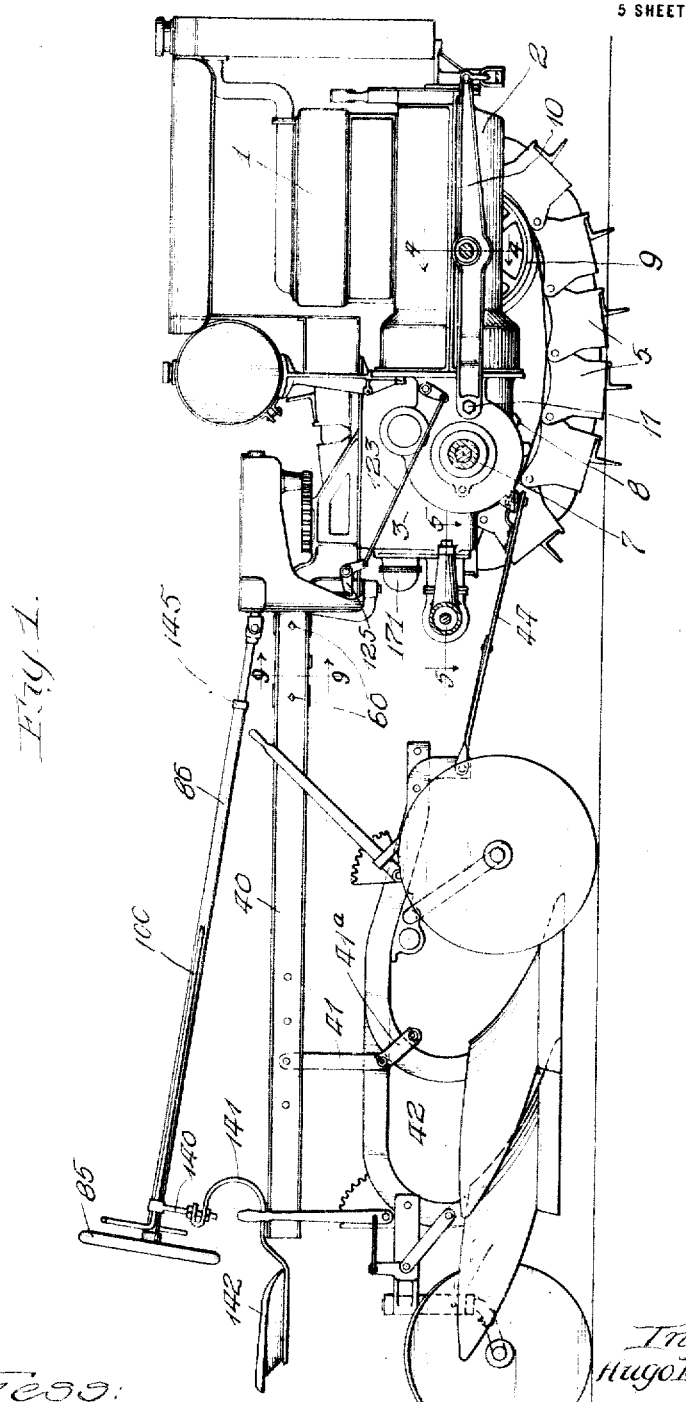

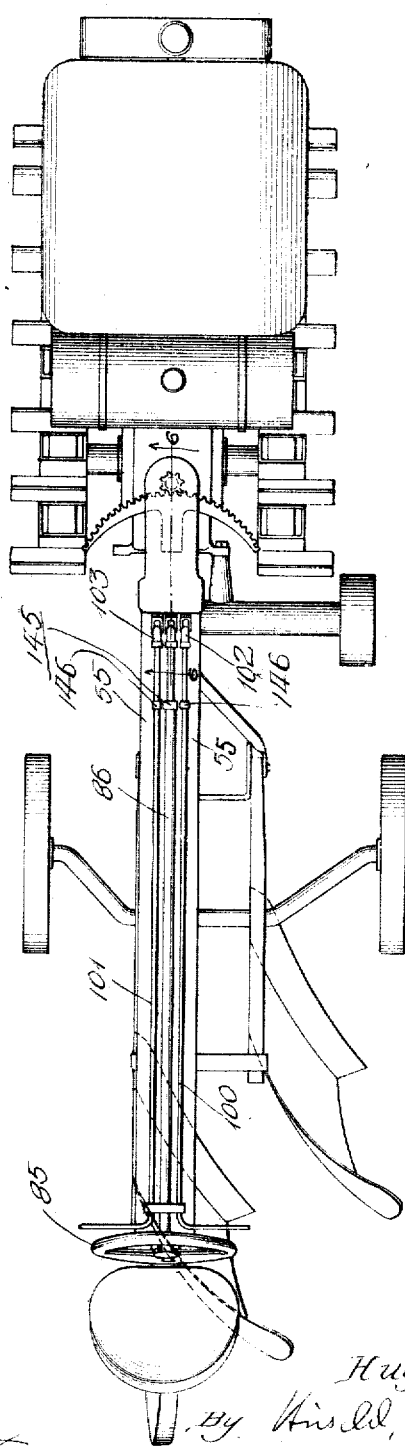

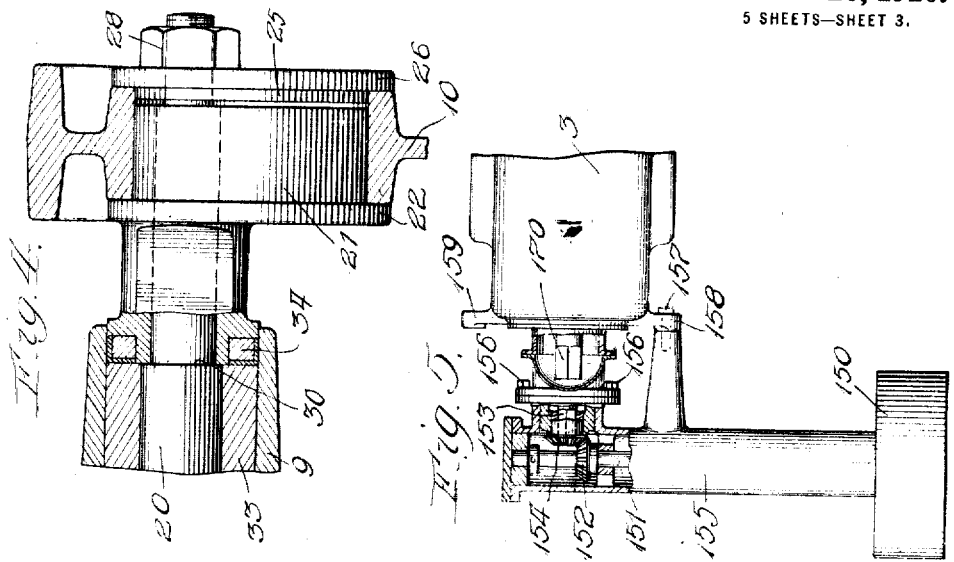

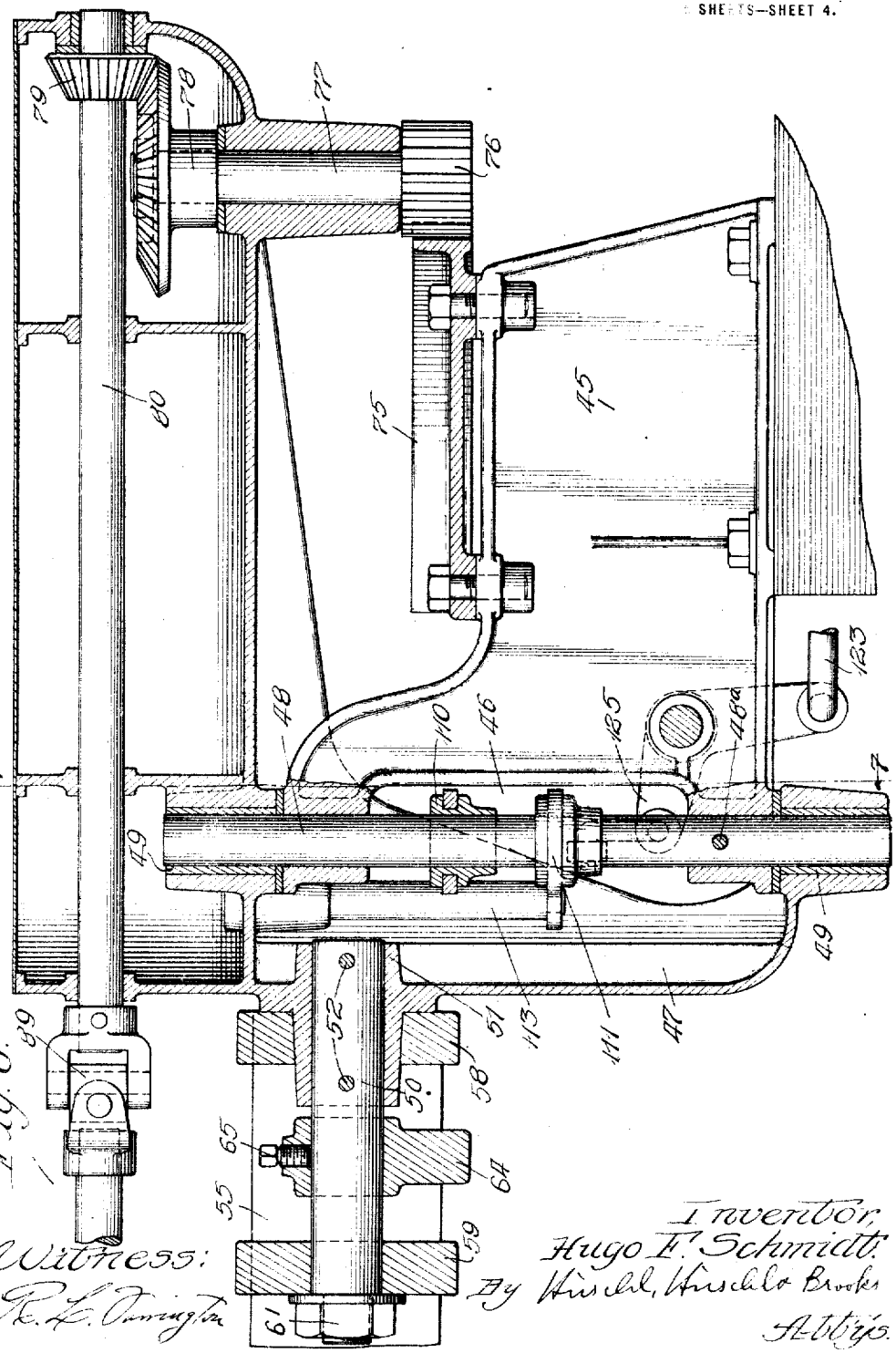

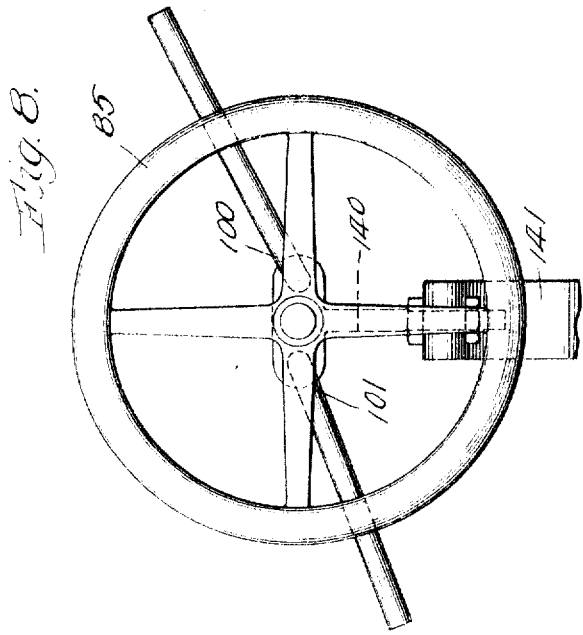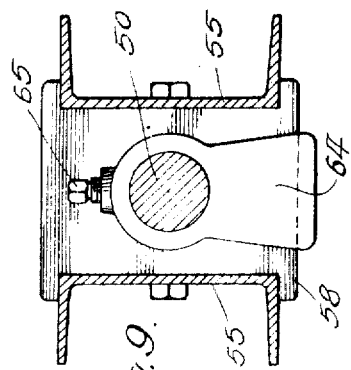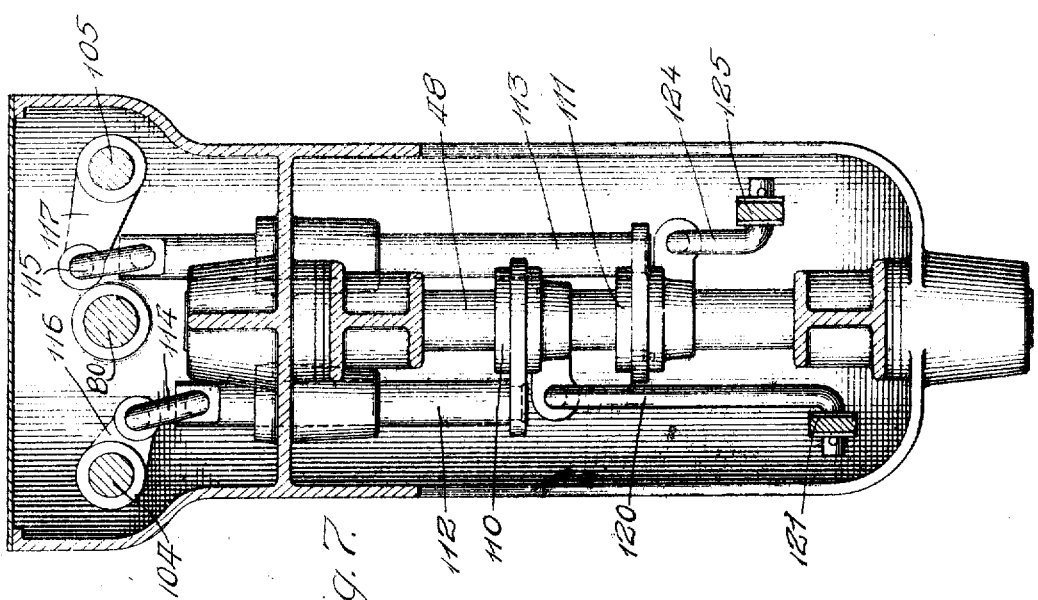

UNITED STATES PATENT OFFICE.

HUGO F. SCHMIDT, OF CHICAGO, ILLINOIS.

TRACTOR.

1,356,744.   Specification of Letters Patent.   Patented Oct. 26, 1920.

Application filed February 9, 1918.  Serial No. 216,303.

*To all whom it may concern:*

Be it known that I, HUGO F. SCHMIDT, a citizen of the United States, residing at 2245 North Kedzie Boulevard, Chicago, Cook county, Illinois, have invented new and useful Improvements in Tractors, of which the following is a specification.

This invention relates to improvements in tractors for general haulage and power purposes and among the objects of the invention are to provide a machine adapted for use on a farm in connection with any one of the standard farming implements in common use, without any alteration of the latter whatever, the machine being so designed and arranged that the various implements may be connected to it and pulled or dragged in much the same manner as could be done with teams of horses. Other objects of the invention are to provide a machine of the nature described which shall be light, strong and powerful and adapted for use over rough and broken ground and through soft soil and mud. It has been necessary, therefore, to provide a frame structure adapted for such service and a linked track or caterpillar type of drive chain for carrying the weight of the machine over the ground.

A machine embodying the principles of the invention is illustrated in the accompanying drawings in which:

Figure 1 is a view of the complete tractor in side elevation.

Fig. 2 is a top plan view.

Fig. 3 is a view in front elevation.

Fig. 4 is a transverse vertical section on the line 4—4 of Fig. 1.

Fig. 5 is a horizontal section on the line 5—5 of Fig. 1.

Fig. 6 is a longitudinal vertical section on the line 6—6 of Fig. 2.

Fig. 7 is a transverse vertical section on the line 7—7 of Fig. 6.

Fig. 8 is a view in rear elevation showing the steering wheel and control levers.

Fig. 9 is a transverse vertical section on the line 9—9 of Fig. 1.

As shown in said drawings, the complete tractor is made with a unitary frame structure comprising an engine and a gear set housing bolted together, these parts being supported directly on wheels which rest on a pair of continuous linked tracks or caterpillar drive chains, so that no other frame of any sort is required. Accordingly there is shown an engine, preferably of the ordinary internal combustion type, comprising a set of cylinders, 1, and a crank case, 2, to which there is bolted a transmission gear set housing 3. These parts form a unitary frame structure, rigid and strong, providing journals and supports for all of the moving parts of the mechanism; and their weight is carried on a pair of endless linked tracks, or caterpillar chains 5, one on each side of the machine. Within the transmission gear set housing are arranged the driving gears for providing the necessary changes of gear combination, and for reversing, the machine being driven through a pair of drive shafts 7 having at their outer ends driving sprockets 8, which mesh into the drive chains 5; the weight of the front end of the machine being carried on the drive chains by idler wheels 9.

On each side of the engine crank case 2 is a horizontal beam or bar 10, the rear end of which is connected to the transmission gear set housing by a pivot bolt 11, and the front end of which is shackled by a pair of shackles 15 to the ends of a transverse spring, 16, carrying the weight of the forward part of the engine frame through a large bracket 18 bolted to the engine crank case. Each of these beams is supported between its ends on one of the idler wheels 9, the wheel being journaled on an axle shaft 20 which is fixed in the middle part of the beam. At about the center of each beam there is made a large opening to receive a cylindric part 21 (see Fig. 4) through which the shaft 20 extends eccentrically, so that by rotating the cylindric part the distance between the two wheels 8 and 9 may be varied to provide the necessary adjustment of chain tension. The part 21 is made with a projecting radial flange 22, and into the opening in the bar from the opposite side is fitted a corresponding circular plate or disk 25 with a similar flange 26. The axle shaft 20 extends through these two parts and is made with a projecting threaded end and is provided with a nut 28; and the axle shaft is also made with a ledge or shoulder 30, so that by tightening the nut 28 the two parts 21 and 25 may be clamped together to secure the axle shaft in its position of correct adjustment. The wheel 9 turns on the axle shaft 20 with the interposition of a bushing 33 and a thrust collar 34 to take the wear. The two endless linked tracks or caterpillar chains 5 on each side of the machine are made in such form as to embody within them means for preventing the lower part of each chain, which rests on the ground and carries the weight of the machine, from bending up between the two wheels, the construction of these chains being more particularly set out in my copending application filed January 29, 1918, Serial No. 214,413.

As the machine is supported on the ground through these two chains alone, other means must be provided to secure the necessary fore-and-aft stability and to provide for steering the machine, and accordingly there is secured to the rear part of the transmission joining the upper part of the transmission gear-set housing 3, a long horizontal beam or shaft 40, extending rearwardly and adapted for connection through a link 41 and a clamp 41ª to a wheeled plow or other standard farming implement 42; which latter is pulled or dragged by a draw-bar 44.

The beam 40 is secured through a jointed connection to a large heavy bracket 45 which bolts upon the top of the transmission gear housing 3. This bracket is made with a pair of jaws 46 which are embraced in a large hood-shaped part, or steering head 47, and secured therein by a pivot- or king-bolt 48; the latter being pinned in one of the jaws (indicated at 48ª) and journaled above and below in bushings 49. The part 47 carries a short, fixed, rigid stub shaft 50 which is fixed in a boss 51 and secured by pins 52. The beam or backbone 40 of the machine is made of two channel members 55, arranged parallel and side by side, and joined together at their forward ends by a pair of spacing blocks 58 and 59, to which they are secured by bolts 60. The shaft 50 extends through openings in these blocks and is provided with a nut 61 to hold the parts together, thereby forming a swivel connection between the beam and the bracket 47 to allow a certain amount of twisting of the beam 40; this twisting movement being limited by a stop member 64 secured to the shaft 50 by a set nut 65.

In order to impart the necessary turning movement about the pivot- or king-bolt 48 for steering the vehicle, there is bolted to the top of the bracket member 45 a horizontal gear segment 75, and meshing therewith is a pinion 76 on the lower end of a vertical shaft 77, journaled in the forward part of the hood-shaped member 47. To the upper end of the shaft 77 is fixed a large bevel gear 78, and meshing therewith is a bevel pinion 79 on the forward end of a horizontal steering shaft 80. The machine is provided with a steering wheel 85 and a steering column 86 which is connected through a universal joint 89 with the steering shaft 80, so that by turning the parts through the movement of the steering wheel the course of the machine is directed by the wheels of the implement drawn behind.

Besides the steering of the machine, its control is effected through a pair of control rods, 100 and 101, which are arranged on each side of the steering column 86 and similarly connected through universal joints, 102 and 103, to short shafts, 104 and 105 respectively, which are journaled on each side of the steering shaft 80. On the king bolt 48 and accommodated between the jaws of the supporting bracket 49 are a pair of sliding hubs, 110 and 111, which are connected through vertical sliding rods, 112 and 113, and links, 114 and 115, to cranks, 116 and 117, on the two shafts, 104 and 105 respectively. The hub 110 is connected through a rod 120 to a bell crank lever 121 which controls the clutching and unclutching and the braking of the machine through a rod 123 (see Fig. 1); and the hub 111 is similarly connected through a rod 124 to a bell crank lever 125 which controls the gear changes and the reverse gear combination in the transmission gear-set housing. It is intended that the running of the engine shall be automatically controlled through a governor on the throttle, and automatic shifting of the spark or ignition points, so that the tractor is entirely controlled through the steering wheel 85 and the two control rods or levers, 100 and 101. These parts are supported at their ends by a short post 140 which is connected to the rear end of the beam 40 by a curved spring 141; the spring being continued backward to support a seat 142 for the driver so that not only is his weight carried by a spring support, but vibration from the machine is absorbed through the spring connection 141 between the beam 40 and the steering wheel and control levers. When the machine is used with some of the standard farming implements, which are considerably longer than the wheeled plow here shown, it is advantageous to detach the spring 141, with the seat 142 and the steering column and control levers, from the beam 40 and mount them on the rear part of the implement; this being permitted by telescopic joints 145 and 146, in the column and in the control rods respectively.

The machine is provided with a belt pulley 150 to adapt it for general power purposes, this pulley being fixed on the end of a transverse horizontal shaft 151 carrying a bevel gear 152. The engine clutch shaft is continued rearwardly through the gear-set housing and its rear end is squared, as indicated at 153, to engage in a squared opening in the hub of a bevel gear 154 meshing with the gear 152. The shaft 151 is journaled in a sleeve 155 which is bolted to the end of the gear housing by a pair of symmetrically arranged bolts 156 and a bolt 157, the latter engaging in a projection 158 at one side of the gear housing. On the other side of the housing is a similar projection 159, so that if desired the sleeve may be turned about and bolted to the latter projection, thus bringing the belt pulley 150 on the other side of the machine; or when not required the sleeve and shaft may be removed entirely. As the particular arrangement of the clutch and the change gears within the housing 3 is no necessary part of the present invention, they are not here shown, but their design includes a counter shaft 170 which likewise extends back through the rear wall of the gear-set housing and is squared, as indicated 170, and covered by a removable cap or cover 171, so that this shaft can be used also for imparting movement to the machinery of one of the implements used in connection with the machine.

By means of the construction above described, with the engine and gear-set housing forming a unitary frame structure, it is possible to make the tread, or width, of the complete tractor little greater than the width of the engine; so that the tractor as here shown may operate between rows of corn for plowing and planting other crops, in accordance with approved farming methods. While the tread is thus made narrow, stability is obtained through a low center of gravity—an advantage secured through the use of the two linked tracks instead of large wheels of equivalent diameter.

An additional advantage of the narrow tread is that in plowing the tractor may run entirely on the solid ground while the plow would have one wheel on the unbroken ground and one wheel in the furrow previously cut.

I claim as my invention:

1. A tractor comprising a frame structure supported on a pair of endless linked tracks and adapted for coupling to an implement, a forked bracket on the frame structure, a steering head connected to the bracket through a vertical pivot bolt, a horizontal beam extending rearwardly over the implement and swiveled at its forward end to the steering head, a steering gear between the head and the bracket to turn the bracket on its pivot, a steering column supported by the beam and connected to the steering gear, a control rod arranged above the beam, and means for connecting the control rod to the mechanism of the machine, such means including a part sliding vertically on the pivot bolt.

2. A tractor comprising a frame structure supported on a pair of endless linked tracks and adapted for coupling to a farming implement, a beam extending rearwardly over the implement from the tractor frame and connected thereto, a forked bracket on the frame structure, a hinged joint connecting the beam to the bracket through a vertical pivot bolt engaging the two jaws of the bracket, a driver's seat at the rear end of the beam, a steering column and a control rod arranged above the beam, a gear segment on the bracket, a pinion meshing therewith to control the steering head, means for connecting the steering column to the pinion, a crank arm connected to the control rod, a sliding part on the pivot bolt, and means for connecting the sliding part to the crank arm and to the mechanism of the tractor, whereby such mechanism is controlled independently of the operation of the steering gear.

3. A tractor comprising an engine and a gear set housing forming a unitary frame structure supported on a pair of endless linked tracks and adapted for coupling to a farming implement, driving sprockets meshing in the linked tracks, a horizontal beam on each side of the frame structure, a pivotal connection between one end of each beam and the frame structure, a load supporting spring shackled to the opposite end of each beam and a wheel carrying the load at the middle part of each beam on the corresponding linked track.

4. A tractor comprising an engine and a gear set housing forming a unitary frame structure supported on a pair of endless linked tracks and adapted for coupling to a farming implement, driving sprockets meshing in the linked tracks, a horizontal beam on each side of the frame structure, a pivotal connection between one end of each beam and the frame structure, a load supporting spring shackled to the opposite end of each beam, a wheel carrying the load at the middle part of each beam on the corresponding linked track, and means for adjustably varying the position of the wheel with respect to an end of the beam to vary the chain tension.

In witness whereof, I have hereunto subscribed my name this twenty-fourth day of January, 1918.

HUGO F. SCHMIDT.